V. A. WOLCOTT.
SYNCHRONISM INDICATOR.
APPLICATION FILED SEPT. 9, 1911.
1,091,722.
Patented Mar. 31, 1914.
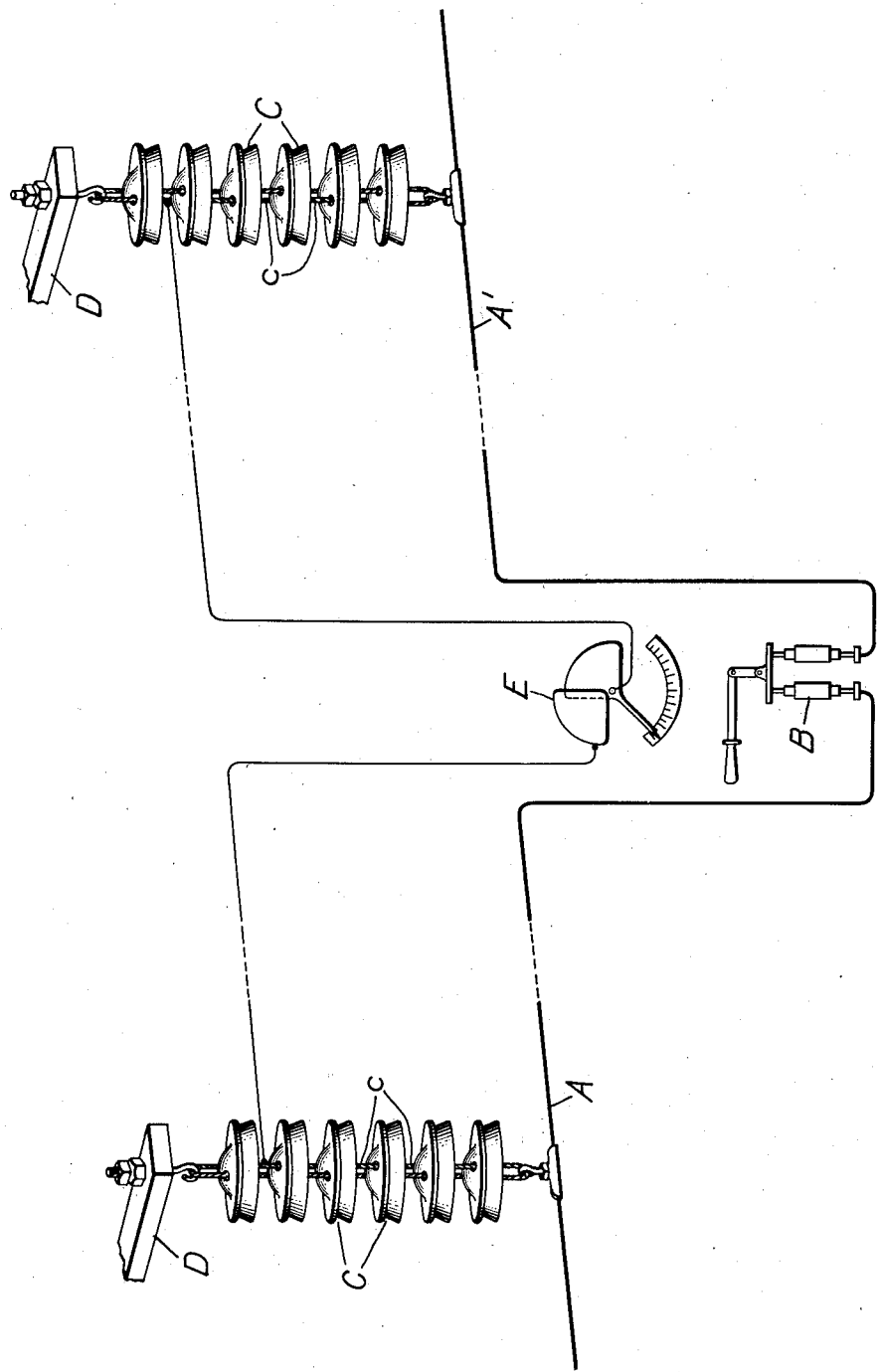
Witnesses:
George H. Tilden
J. Ellis Eler
Inventor:
Varanus A. Wolcott,
by Albert G. Davis
His Attorney.

UNITED STATES PATENT OFFICE.

VARANUS A. WOLCOTT, OF BUTTE, MONTANA, ASSIGNOR TO GENERAL ELECTRIC COMPANY, A CORPORATION OF NEW YORK.

SYNCHRONISM-INDICATOR.

1,091,722. Specification of Letters Patent. Patented Mar. 31, 1914.

Application filed September 9, 1911. Serial No. 648,577.

*To all whom it may concern:*

Be it known that I, VARANUS A. WOLCOTT, a citizen of the United States, residing at Butte, in the county of Silverbow, State of Montana, have invented certain new and useful Improvements in Synchronism-Indicators, of which the following is a specification.

My invention relates to synchronism indicators for high tension transmission lines and its object is to provide a simple and reliable synchronism indicator and connections therefor which are particularly adapted to locations where it is desired to synchronize transmission lines but where there are no step-down transformers available for supplying low voltage to a synchronism indicator of the ordinary type.

In the majority of locations where it is desired to synchronize high tension transmission lines there are step-down transformers, to the secondaries of which a synchronism indicator of the ordinary type may be connected, but there are many cases which arise where no such transformers are available. It then becomes necessary if synchronism indicators of the ordinary type are to be used, to provide special step-down transformers, and, if the voltage of transmission lines is high, these small transformers become very expensive. By my invention it is possible to dispense entirely with costly step-down transformers in such cases. I obtain this result by providing an electrostatically actuated synchronism indicator, similar in construction to an ordinary electrostatic voltmeter, and connections for impressing on the indicator electrostatic voltages proportional to, but less than, the instantaneous values of the electrostatic voltage between the respective line conductors and ground. Since almost all high tension transmission lines to-day are supported by a suspension type of insulator, each support comprising a series of these insulators, the connections for impressing the desired voltage on the synchronism indicator may be readily and simply obtained by connecting the indicator leads to points between the first and second insulator from ground of a series of insulators for each conductor.

My invention will best be understood by reference to the accompanying drawing which shows diagrammatically a synchronism indicator arranged in accordance with my invention.

In the drawing, A and A' represent high tension conductors constituting one phase of an alternating current transmission system.

B represents a switch for connecting the two conductors together when the voltages thereon are in synchronism.

Each conductor is supported by a series of suspension insulators C, which are mechanically connected by short pieces of cable *c*.

D, D represent cross arms on the towers carrying the transmission lines.

E represents an electrostatically actuated indicating instrument which may be constructed like any of the types of electrostatic voltmeters heretofore known in the art and which is indicated diagrammatically as comprising a stationary vane, a movable vane, and a needle or pointer carried by the movable vane and moving over a suitable scale. The stationary and movable vanes respectively are connected to points between the first and second insulators from ground of the series of insulators supporting the two conductors A and A' respectively. These indicator leads therefore receive from the conductors A and A', by electrostatic induction, and impress on the indicator, voltages equal to definite fractions of the electrostatic voltages between said conductors and ground, that is, voltages proportional to, but less than, the instantaneous values of the respective electrostatic voltages of the respective conductors, so that between the stationary and movable vanes there exists at each instant an electrostatic voltage proportional to, but less than, the vectorial sum of the instantaneous values of the electrostatic voltages between the two conductors and ground. When the voltages on the two conductors are equal in amount and are in synchronism, no potential difference exists between the stationary and movable vanes of the indicator, so that the needle stands in zero position. If the voltages are not in synchronism, an electrostatic voltage exists between the two vanes and the needle moves over the scale. Thus the device indicates accurately the condition of synchronism, and, if the voltages are out of synchronism, this needle vibrates with a frequency corresponding to the amount by which the voltages are out of synchronism.

I do not desire to limit myself to the particular construction and arrangement of parts shown and described but aim in the appended claims to cover all modifications which are within the spirit and scope of my invention.

What I claim as new, and desire to secure by Letters Patent of the United States, is:—

1. In combination with a plurality of high tension alternating current conductors, insulating supports therefor, a switch for connecting said conductors together, and a synchronism indicator comprising an electrostatically actuated indicator electrically connected between said insulating supports, the points of connection of said indicator to said insulating supports being between the ends of said insulating supports.

2. In combination with a plurality of high tension alternating current conductors, supports therefor each comprising a plurality of insulators in series, a switch for connecting said conductors together, and a synchronism indicator comprising an electrostatically actuated indicator connected between corresponding points on said supports.

3. In combination with a plurality of high tension alternating current conductors, supports therefor each comprising a plurality of insulators in series, a switch for connecting said conductors together, and a synchronism indicator comprising an electrostatically actuated indicator connected to points between the first and second insulators from ground of each of said series.

In witness whereof, I have hereunto set my hand this first day of September, 1911.

VARANUS A. WOLCOTT.

Witnesses:
  A. D. PRITCHARD,
  R. G. HOPPER.